Sept. 5, 1939.   L. THUILLARD   2,172,133

SEPARATOR

Filed Dec. 14, 1937

L. Thuillard
INVENTOR,
BY Glascock
Downing &
Seebold
ATTORNEYS

Patented Sept. 5, 1939

2,172,133

UNITED STATES PATENT OFFICE 2,172,133

SEPARATOR

Léon Thuillard, Paris, France

Application December 14, 1937, Serial No. 179,779
In France December 24, 1936

8 Claims. (Cl. 183—76)

The object of the present invention is an apparatus for separating impurities from the gases which draw them along wherein the gases are caused to pass into one or several bent conduits which discharge a first separation of the impurities from the gases under the action of centrifugal force, and then discharging these gases into an enclosure of relatively large dimensions, thus producing an abrupt retardation in their speed, said enclosure comprising an inclined platform along which slide the impurities left by the gases, and the gaseous current is finally caused to traverse obstacles which are also inclined to the horizontal.

The apparatus preferably comprises the following features:

(1) At least some of the obstacles are movable, thus permitting them to be displaced in order to cause the impurities which have been deposited on them to fall off.

(2) Some of the obstacles can be made to vibrate so as to cause the impurities which have been deposited on them to fall off.

(3) The movements of the movable obstacles or the vibrations to which they can be subjected are controlled from the outside.

(4) The chamber containing the movable or vibrating obstacles communicates at its lower part with the enclosure above-mentioned, thus permitting the impurities collected in this chamber to fall into the said enclosure.

(5) The lowest point of the enclosure communicates with a receiver in which are gathered the impurities collected in the enclosure and, if necessary, in the obstacle chamber.

More particularly, the present invention consists of an apparatus for separating impurities from the gases which draw them along constituted by an enclosure wherein the gases expand after having passed into one or several bent conduits leading directly into the upper part of the said enclosure in such a way that the impurities which can be deposited on these conduits can fall freely into the said enclosure, and before passing between obstacles also arranged above the said enclosure and inclined to the horizontal so that the impurities which can be stopped by them can fall into the said enclosure either directly or through suitable apertures, the said obstacles being preferably adapted to be moved or to be subjected to vibrations for facilitating the fall of the impurities.

The invention is illustrated by way of example in the accompanying drawing in which.

Figure 1:
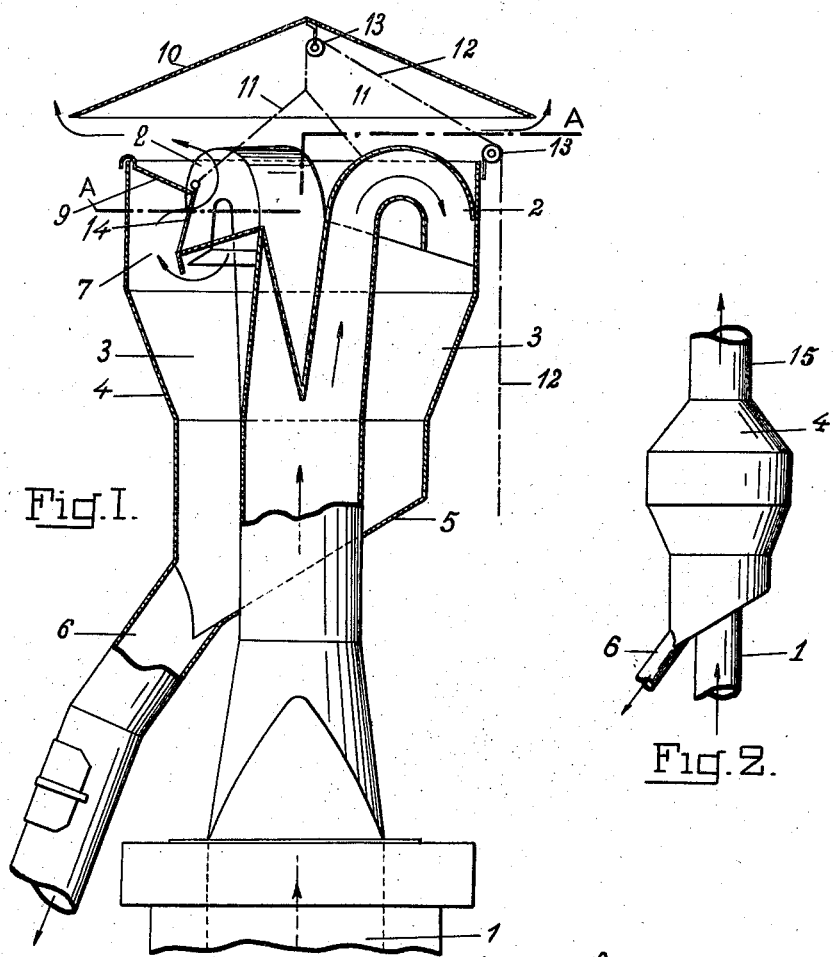
Figure 1 is a section of an apparatus according to the present invention intended to trap soot drawn along by the fumes of a combustion stove and arranged above the smoke flue of said combustion stove.

In the case of Figure 1, the fumes emitted by the furnace and led through the smoke flue 1 are spread out into three doubly bent passages 2, arranged at 120° to one another, and then pass into an expansion chamber 3 arranged below the said bent passages 2. The solid impurities (dust, soot, etc.) drawn along by the fumes fall on to the inclined bottom 5 of the enclosure 3 on account of the abrupt retardation of the speed of flow of the fumes in the enclosure 3, and are discharged through the pipe 6 which leads them into a box, not shown, from which they are periodically extracted.

The fumes leaving the bent passages 2 tend to reascend and escape through apertures 7 pierced in inclined metal sheets 8 arranged between the bent passages 2 and forming the top of the enclosure 3.

Obstacles 9 placed above these apertures 7 force the fumes to change direction. The edges of the metal sheets 8 and the obstacles 9 are curbed back so as to hold the lighter solid particles which have not remained in the enclosure 3. The gases thus purified finally escape into the atmosphere by passing into the space left free between the upper edge of the casing 4 of the apparatus and its cover 10.

The obstacles 9 are movable and are attached by small chains 11 to a chain 12 which passes over pulleys 13 secured respectively to the cover 10 and to the casing 4 and which can be actuated from the outside. On the rims of the obstacles 9 are secured rods 14 which strike against the metal sheets 8 and cause them to vibrate.

By moving the obstacles 9, the soot and dust adhering to their edges are caused to fall into the enclosure 3 through the apertures 7. The vibrations of the metal sheets 8 due to the movement of the obstacles 9 transmitted by the rods 14 cause the impurities adhering to their edges to fall off. All the impurities collected by the apparatus are thus gathered into the box.

Figure 2:
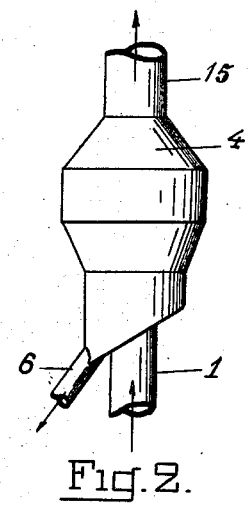
Figure 2 is an outside view of a conduit on which is mounted an apparatus according to the present invention.
Figure 3:
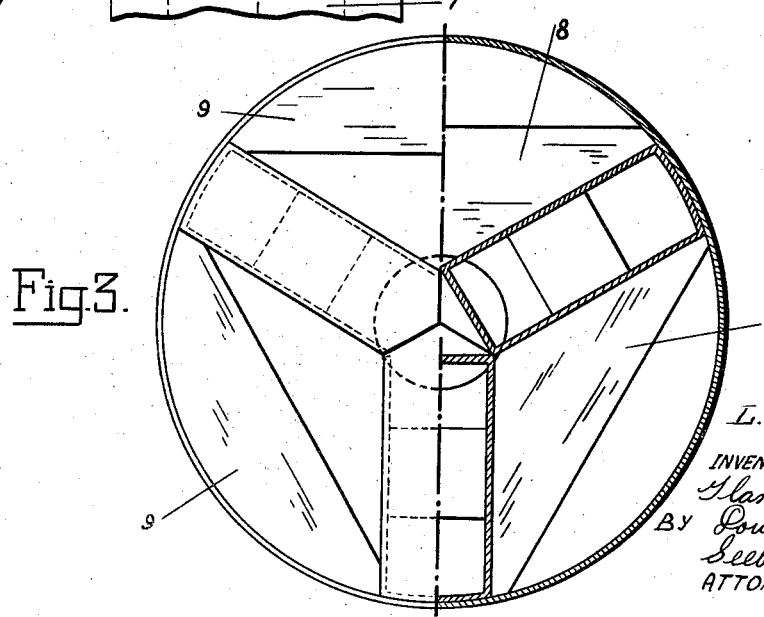
Figure 3 is a section on line A—A of Figure 1.

In the case of Figure 2 the gases led through the conduit 1, after having traversed the obstacles, instead of escaping into the atmosphere as in the previous case flow into a conduit 15 which is an extension of the conduit 1.

I claim:

1. Apparatus for separating impurities from gases, comprising in an enclosure having a cylindrical-conical portion, a central conduit for introducing gases in an upward direction, the said conduit expanding into several separate conduits bent in radiating planes so as to cause the gases to descend and emerge against the enclosure, the gases undergoing an expansion at this moment, triangular baffles arranged between the said bent conduits for partially closing the intermediate spaces comprised between the said conduits and the central conduit while leaving a passage only along the enclosure so as to impose upon the gases a horizontal path followed by a vertical ascending path and means for causing sudden changes of direction of the gases before their discharge.

2. Apparatus for separating impurities from gases, comprising in an enclosure having a cylindrical-conical portion, a central conduit for introducing gases in an upward direction, the said conduit expanding into several separate conduits bent in radiating planes so as to cause the gases to descend and emerge against the enclosure, the gases undergoing an expansion at this moment, triangular baffles arranged between the said bent conduits for partially closing the intermediate spaces comprised between the said conduits and the central conduit while leaving a passage only along the enclosure so as to impose upon the gases a horizontal path followed by a vertical ascending path and baffles in the form of segments arranged above the triangular baffles and secured to the enclosure between the bent conduits so as to form a passage for the gases only in the central portion of the apparatus and to cause sudden changes of direction of the gases before their discharge.

3. Apparatus for separating impurities from gases, comprising in an enclosure having a cylindrical-conical portion, a central conduit for introducing gases in an upward direction, the said conduit expanding into several separate conduits bent in radiating planes so as to cause the gases to descend and emerge against the enclosure, the gases undergoing an expansion at this moment, triangular baffles arranged between the said bent conduits for partially closing the intermediate spaces comprised between the said conduits and the central conduit while leaving a passage only along the enclosure so as to impose upon the gases a horizontal path followed by a vertical ascending path and inclined baffles in the form of segments arranged above the triangular baffles and secured to the enclosure between the bent conduits so as to form a passage for the gases only in the central portion of the apparatus and to cause sudden changes of direction of the gases before their discharge.

4. Apparatus for separating impurities from gases, comprising an outer enclosure having an inclined lower bottom and provided with an upper cylindrical portion in which there is a central conduit for introducing gases in an upward direction, the said conduit expanding into several separate conduits bent in radiating planes so as to cause the gases to descend and emerge against the enclosure, the gases undergoing an expansion at this moment, triangular baffles arranged between the said bent conduits for partially closing the intermediate spaces comprised between the said conduits and the central conduit while leaving a passage only along the enclosure so as to impose upon the gases a horizontal path followed by a vertical ascending path and baffles in the form of segments arranged above the triangular baffles and secured to the enclosure between the bent conduits so as to form a passage for the gases only in the central portion of the apparatus and to cause sudden changes of direction of the gases before their discharge.

5. Apparatus for separating impurities from gases, comprising a cylindrical-conical enclosure open at its upper portion and closed at its lower portion by an inclined bottom in the center of which there is a conduit for introducing gases in an upward direction, which expands at the height of the cylindrical portion of the enclosure into several separate conduits bent in radiating planes emerging against the enclosure so as to cause the gases to descend, the gases undergoing an expansion at this moment, triangular baffles arranged between the said bent conduits for partially closing the intermediate spaces comprised between the said conduits and the central conduit while leaving a passage only along the enclosure so as to impose upon the gases a horizontal path followed by a vertical ascending path and baffles in the form of segments arranged above the triangular baffles and secured to the enclosure between the bent conduits so as to form a passage for the gases only in the central portion of the apparatus, and an upper cover, the diameter of which is larger than that of the enclosure, said cover being arranged above the latter so as to leave a passage for the discharge of the gases separated from their impurities.

6. Apparatus for separating impurities from gases, comprising a cylindrical-conical enclosure connected at its upper portion to a pipe for the discharge of the gases and closed at its lower portion by an inclined bottom, in the center of which there is a conduit for introducing gases in an upward direction, which expands at the height of the cylindrical portion of the enclosure into several separate conduits bent in radiating planes and emerging against the enclosure so as to cause the gases to descend, the gases undergoing an expansion at this moment, triangular baffles arranged between the said bent conduits for partially closing the intermediate spaces comprised between the said conduits and the central conduit while leaving a passage only along the enclosure so as to impose upon the gases a horizontal path followed by a vertical ascending path, and baffles in the form of segments arranged above the triangular baffles and secured to the enclosure between the bent conduits so as to form a passage for the gases only in the central portion of the apparatus and to cause sudden changes of direction of the gases before their discharge.

7. Apparatus for separating impurities from gases, comprising in an enclosure having a cylindrical-conical portion, a central conduit for introducing gases in an upward direction, the said conduit expanding into several separate conduits bent in radiating planes so as to cause the gases to descend and emerge against the enclosure, the gases undergoing an expansion at this moment, triangular baffles arranged between the said bent conduits for partially closing the intermediate spaces comprised between the said conduits and the central conduit while leaving a passage only along the enclosure so as to impose upon the gases a horizontal path followed by a vertical ascending path and movable baffles in the form of segments arranged above the triangular baffles and secured to the enclosure between the bent conduits so as to form a passage for the gases only in the central portion of the apparatus and to cause sudden changes of direction of the gases before their discharge, rods secured to the said baffles and resting upon the triangular baffles placed underneath, and means for ensuring the displacement of the upper baffles.

8. Apparatus for separating impurities from gases, comprising in an enclosure having a cylindrical-conical portion, a central conduit for introducing gases in an upward direction, the said conduit expanding into several separate conduits bent in radiating planes so as to cause the gases to descend and emerge against the enclosure, the gases undergoing an expansion at this moment, triangular baffles arranged between the said bent conduits for partially closing the intermediate spaces comprised between the said conduits and the central conduit while leaving a passage only along the enclosure so as to impose upon the gases a horizontal path followed by a vertical ascending path and means for causing the upper and lower baffles to vibrate for ensuring the fall of the dust deposited thereon.

LÉON THUILLARD.